United States Patent

[11] 3,632,449

[72] Inventors Michel N. Yardney
 336 Central Park W., New York, N.Y. 10025;
 Nuri Kohen, Jackson Heights, N.Y.
[21] Appl. No. 837,652
[22] Filed June 30, 1969
[45] Patented Jan. 4, 1972
[73] Assignee Michel N. Yardney
 New York, N.Y.

[54] METHOD OF MAKING AND OPERATING A GAS-DEPOLARIZED CELL
 2 Claims, 8 Drawing Figs.

[52] U.S. Cl. .................................................. 136/86 A
[51] Int. Cl. ........................................... H01m 27/00
[50] Field of Search ......................................... 136/86

[56] References Cited
 UNITED STATES PATENTS
 2,938,064 5/1960 Kordesch ................... 136/86

3,378,406 4/1968 Rosansky ................... 136/86

Primary Examiner—Winston A. Douglas
Assistant Examiner—H. A. Feeley
Attorney—Karl F. Ross ABSTRACT: A battery of the metal/gas-electrode type includes a gas-depolarizable cathode forming at least one pocket or passage open to the outside by way of a slot (or a pair of opposite slots) in the cell housing. The cathode is in fluidtight contact with the slotted housing and subdivides the interior of the housing into a gas passage or compartment and a surrounding electrolyte compartment. Anode plates are disposed in the electrolyte compartment and may be interconnected to form a unit detachable from the cathode upon withdrawal of the electrode assembly from the housing. For this purpose the housing may be split into separably interfitting parts. The depolarizing gas circulates through the interior of the housing by thermal convection.

INVENTORS
MICHEL N. YARDNEY
NURI KOHEN

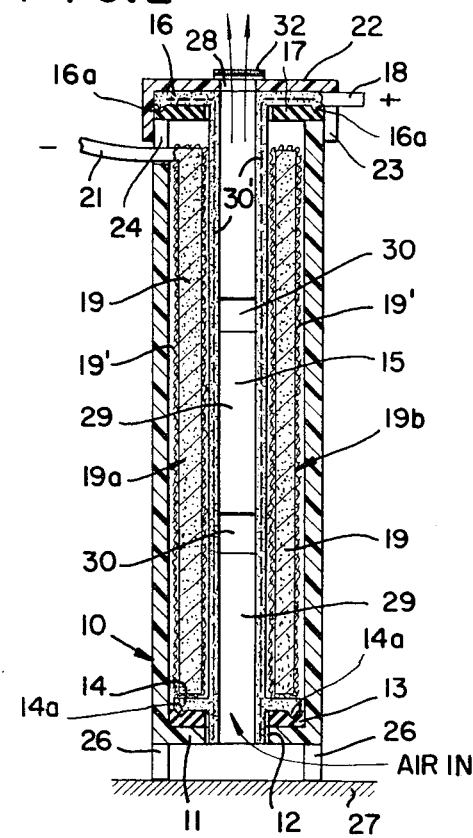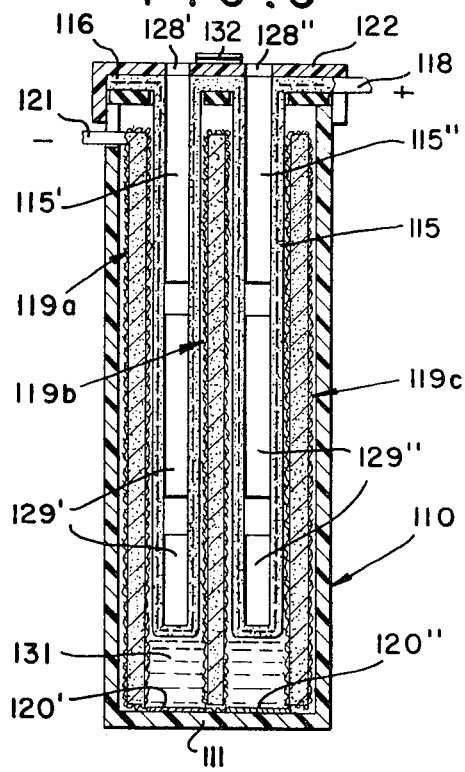

INVENTORS.
MICHEL N. YARDNEY
NURI KOHEN

METHOD OF MAKING AND OPERATING A GAS-DEPOLARIZED CELL

SPECIFICATION

Our present invention relates to a method of making and operating an electrochemical cell for an electric battery of the gas-depolarized refuelable type, i.e., a generator of electrical energy with one or more positive electrodes or cathodes of catalytically active, electrochemically nonconsumable, preferably hydrophobic material, depolarizable by a stream of depolarizing gas, preferably containing molecular oxygen, and oxidizable negative electrodes or anodes juxtaposed therewith and separated therefrom by electrolyte space.

The amount of energy available from such a cell is determined by the storage capacity of its anode material, inasmuch as these gas cathodes will operate efficiently as long as depolarizing gases are supplied to them. Upon substantially complete oxidation of the anode material, however, the negative plates of the battery must be either recharged or else replaced by fresh anode material. A general object of our present invention is to provide a cell construction facilitating such replacement. Another object of this invention is to provide a mode of construction allowing for the use of excess anode material with consequent extended operation of the cell before refueling. A further object is to provide a cell construction that facilitates the convection of the depolarizing gases by thermal circulation.

It is known that anode plates clad in separator material (e.g., nonwoven fabrics of electrolyte-resistant synthetic fibers), such as zinc plates, tend to swell upon oxidizing in an alkaline electrolyte and also are liable to other shape changes due to gravitation of the oxidized material toward the cell bottom. As a result, the spent electrode assembly develops a certain internal pressure which impedes its extraction from the cell housing for the purpose of refueling the cell by replacing spent anodes by active ones. Thus, another specific object of our invention is to provide a housing construction which simplifies the task of extraction of the spent anode materials and replacement with active materials.

If the positive and negative electrodes slide relatively to each other, upon disassembly and reassembly of such a cell for the purpose referred to, the aforedescribed swelling and dislocation of the anode material may lead to objectionable abrasion and deformation of the cathode structure. It is, therefore, still another object of our invention to provide an arrangement for refueling which avoids the need for such relative sliding.

In the operation of a cell of the character described, waste products tend to accumulate in the region of the anodes. Our invention, accordingly, also aims at providing a construction which, upon disassembly for the purpose of replacement of the negative plates, affords ready access to the anode compartment so that these wastes may be flushed out.

Conventional cells have gas-depolarizable cathodes, made of porous sheet material, in the shape of upwardly open envelopes or shells forming gas pockets whose interior communicates with a supply of oxygen or air. The associated anodes are generally plates of oxidizable metal (such as zinc) contacting the outer surfaces of these cathode shells through intervening separator layers that are impregnated with electrolyte. The cathodic envelope material may consist of a mixture of hydrophobic fluorocarbon resin, i.e., polytetrafluorethylene, and activated particles such as carbon; the latter may be advantageously platinized or coated with some other noble metal in order to increase the catalytic efficiency and service life of the cathode. Catalytic particles consisting entirely of such noble metals may also be used.

In accordance with one aspect of this invention we provide a refuelable gas-depolarized electrochemical cell with a gas-permeable, depolarizing cathode structure of generally tubular shape surrounding an internal space which serves as a gas passage. The outer surface of the cathode structure is in contact with the electrolyte, generally an alkaline solution (KOH). The cell also includes at least one anode electrically connected to the cathode by means of the electrolyte. Two such anodes may bracket this tubular cathode.

Refuelable gas-depolarized cells with the construction of this invention permit the complete disassembly of the cell whereby the gas-depolarizable cathode can be conveniently flushed of any spent anode material, electrolyte residues or oxidized separator materials which may poison the catalysts. This flushing can be accomplished either by rinsing the cathodes in water or merely by air-blowing them clean.

In accordance with another aspect of our present invention, we use an assembly of juxtaposed negative and positive electrodes within a housing which is split into two separably interfitting parts, one of these parts including a slotted or otherwise apertured wall in fluidtight contact with an open end of the cathode structure. If this structure, as mentioned above, also has an opposite open end, as by being in the shape of a flattened tube, the latter end likewise adjoins an apertured housing wall in fluidtight contact therewith. In any event, the shell divides the interior of the cell housing into a gas compartment and a liquid compartment which communicate with each other only through the three-phase depolarizing areas of the cathode structure. The liquid compartment, besides containing and confining the electrolyte located outside the cathode, accommodates one or more anode plates (preferably at least two such plates) which are positioned close to the outer cathode surface and are removable therefrom upon separation of the housing parts whereby the spent anode material and, wastes may be replaced by active anode material and if needed, additional electrolyte.

The use of a tubular cathode with two open ends according to one aspect of this invention allows the depolarizing gas, a stream of air or oxygen, to enter at one end aperture and leave at the other, either through forced circulation or by spontaneous thermal convection from the heat generated by the discharging cell. This circulation of the depolarizing gas provides excellent gas access to all active areas of the cathode. With an apertured bottom of the cell housing elevated above the floor of the battery casing, for example, the heat of operation will cause the air column within the cathode to rise so that a continuous convection circulation ensues. The gas stream, depleted of some of its depolarizing gas, exits through the apertured top wall or lid of the housing. Such a tubular structure may also be provided with an external ledge near its bottom to support the anode plates in close association with the cathode body whereby the spent anodes may be extracted jointly with the cathode from the lower housing portion (generally in the form of a prismatic case) when the lid is lifted along with the attached cathode.

Tubular cathodes according to this invention provide a unique construction for obviating the structural and electrochemical problems heretofore encountered in the design of a cylindrical zinc/air cell. The tubular construction of the cathode permits the use of a porous, e.g., of zinc, anode sleeve which surrounds the cathode and can act as a collector. Such a collector affords an essentially uniform field and assures uniform utilization of the anode material. The tubular or cylindrical construction minimizes the leakage problem since, should the cathode leak, such leakage would only be into the air channel where it can easily be confined to provide minimal damage to the user.

If the electrolyte is initially stored in anhydrous form within the anode material, as is well known per se, a cell recharged by the substitution of a fresh anode of substantially nonoxidized metal may be activated simply by the addition of water.

In use, the intervening space between the anodes and the flattened, tubular cathode or in the cell battery case is occupied by the electrolyte. In the form of free liquid, or preferably, absorbed in the pores of bibulous separators, interposed between the electrodes of opposite polarities. If the flattened or cylindrical, generally tubular cathode stands upright with its channel accessible to ambient air, the heat generated in that channel by the electrochemical reaction within the cathode membrane causes the rising of the air column therein so as to create a "chimney effect" promoting air circulation. This chimneyteffect convection is so pronounced that enough air is passed through the cathode to permit discharge at any rate possible with available oxygen depolarizable catalytic materials without recourse to forced air circulation by blowers or similar means. The airflow through such hollow cathodes has not been a limiting factor even at discharge rates as high as 500 milliamps per square inch of apparent area of cathode material.

The above and other features of our invention will be described in greater detail hereinafter with reference to the accompanying drawing in which:

FIG. 2 is a vertical sectional view of an assembled cell according to the embodiment of FIG. 1;

FIG. 3 is a view similar to FIG. 2, illustrating a modification;

FIG. 4 is a top view of the assembly of FIG. 3 with the lid of the cell casing removed;

FIG. 6 is a perspective view, with parts cut away, of another cell assembly according to our invention including a rechargeable anode;

Figure 1:
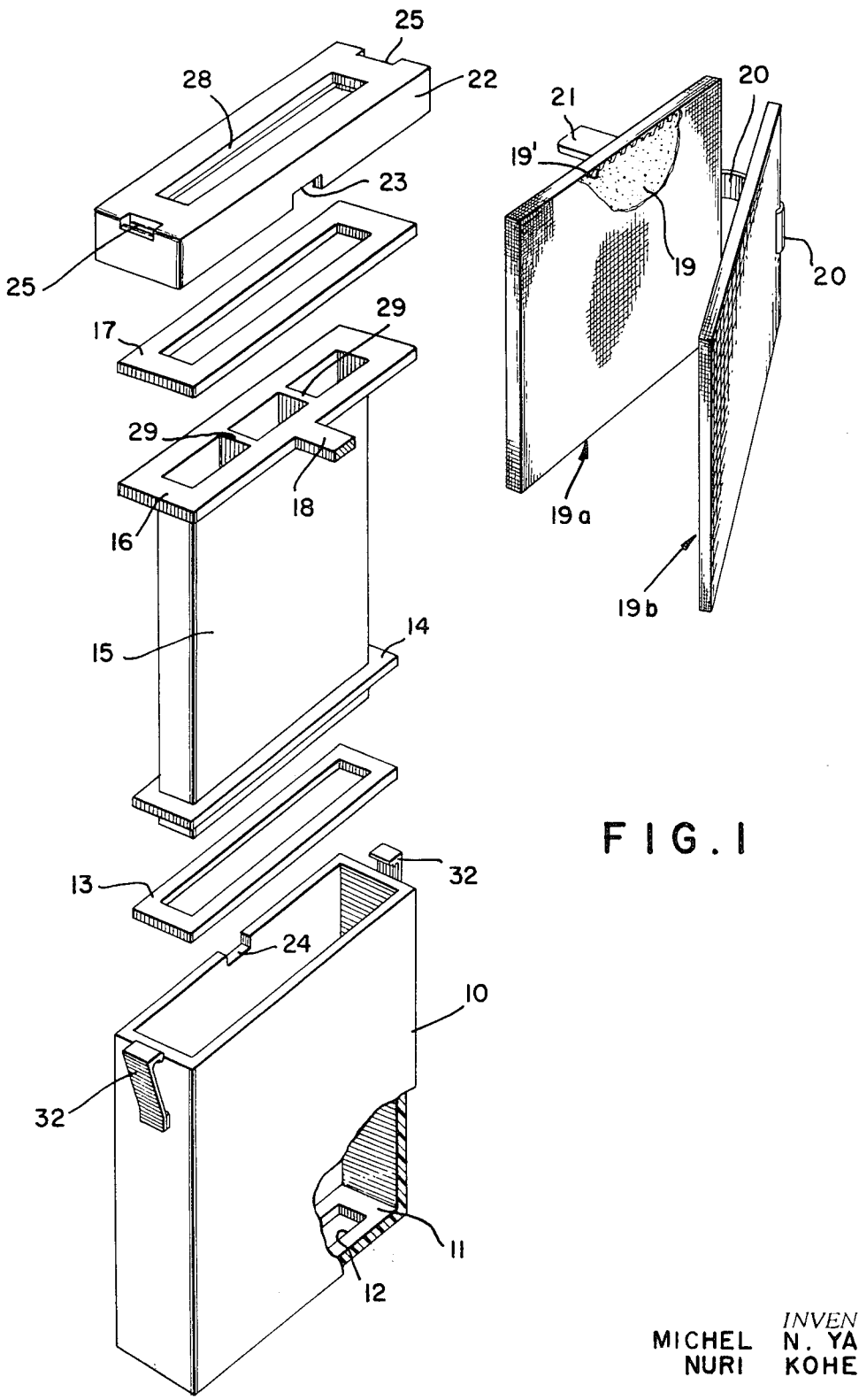
FIG. 1 is an exploded perspective view of a cell assembly according to our invention.
Figure 7:
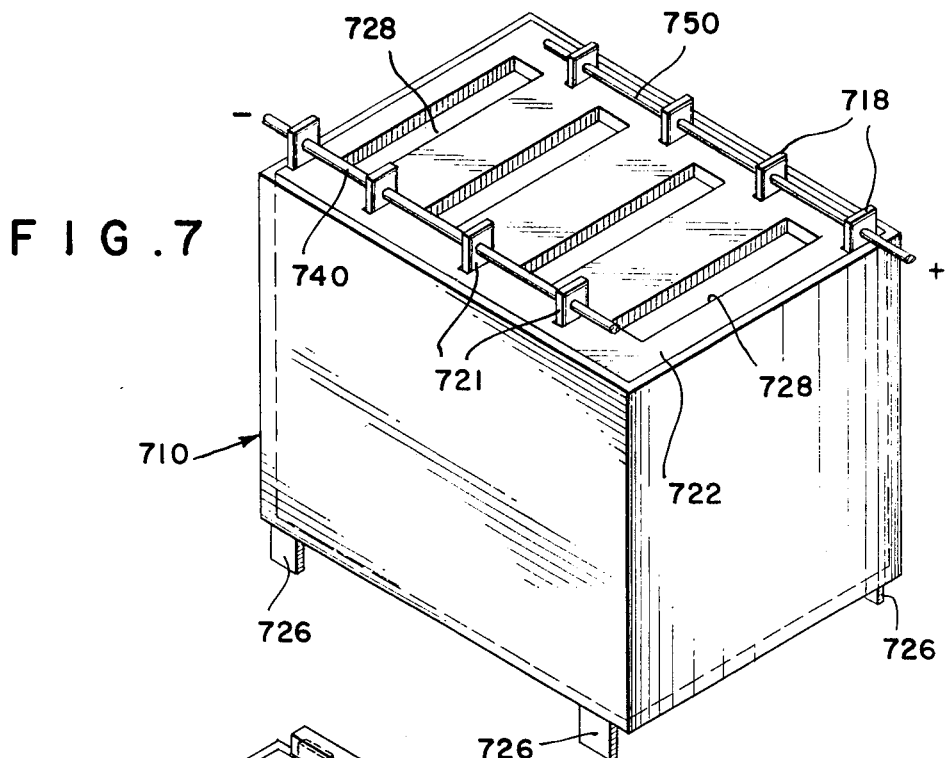
Figure 8:
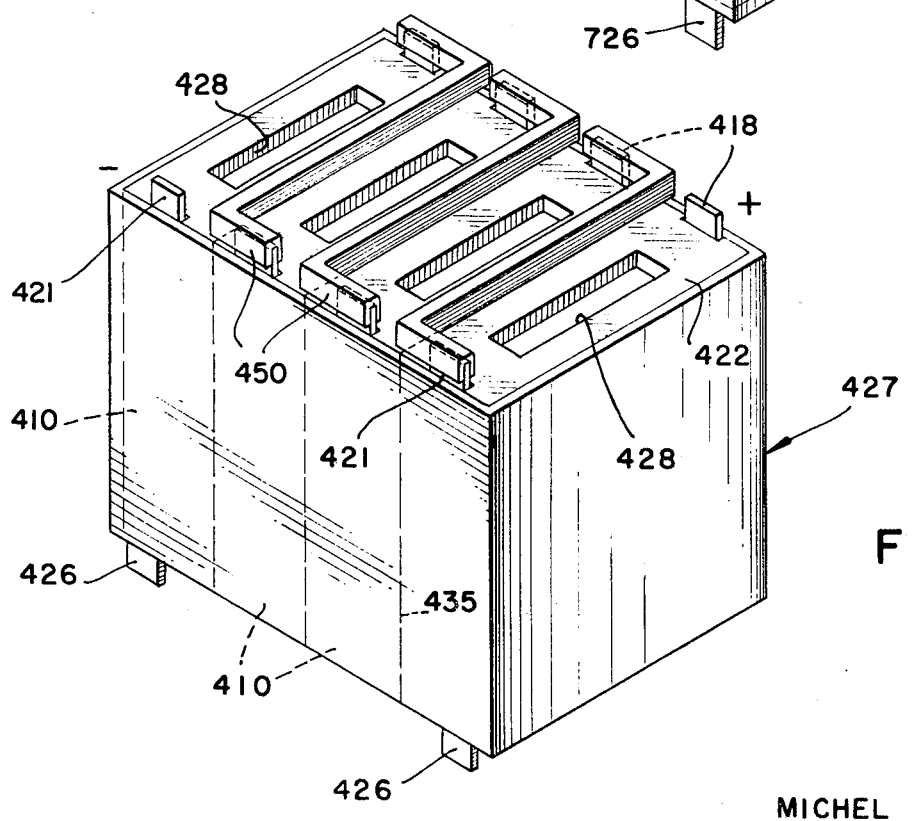

FIG. 7 is a perspective view of a multiple-cathode cell according to this invention; and FIG. 8 is a perspective view of a battery of cells according to this invention In FIGS. 1 and 2 we have shown a battery cell of the aforedescribed semi-fuel-cell, metal/gas-depolarized type comprising a prismatic case 10 of resinous material, this case having an open top and a bottom 11 formed with a slot 12. A similarly slotted packing strip 13 of rubber or other elastomeric material rests on this bottom under pressure of a rectangular ledge 14 near the lower end of a flat gas-permeable tube or sleeve 15 of hydrophobic electrochemically inert but catalytically active cathode material such as the Teflon-carbon mixture referred to above. This sleeve defines a chimneylike passage for a depolarizing gas. The ratio of carbon to Teflon may decrease, progressively or in steps, from the outer sleeve surface to the inside to provide an effective barrier against the penetration of liquid electrolyte into the interior of the sleeve, with the innermost stratum of the sleeve structure consisting preferably of 100 percent Teflon. It is important to maintain a three-phase equalibrium between the depolarizing gas, the liquid electrolyte and the solid catalyst within the body of the cathodic material.

The lower end of sleeve 15, projecting beyond ledge 14, is snugly received in slot 12 of case bottom 11 and is surrounded by the packing strip 13 which is compressed between this case bottom and knife edges 14a depending from ledge 14. A similar fluidtight seal is formed at the top between a marginal flange 16 of sleeve 15 and a knife edge 16a molded into the upper edge of case 10 which is separated from flange 16 by another centrally slotted packing strip 17; the latter, being elastic, can be stretched to clear the ledge 14 or the flange 16 in order to be placed on the shell in the position illustrated in FIG. 2. Flange 16 is integral with a terminal tab 18 through which an external load circuit can be connected to the cathode 15.

A pair of anode plates 19a, 19b, each comprising a metallic body 19 and a surrounding separator 19' of; a porous fabric such as nonwoven nylon filaments or the like, are physically and electrically interconnected by one or more flexible conductor straps 20 and can be connected to the load circuit via a terminal tab 21 here shown to extend from the top of plate 19a. Anodes 19a and 19b flank the cathode 15 and are supported by ledge 14 in the assembled state of the cell. A lid 22, of the same resinous material (e.g., polystyrene) as case 10, fits over the top of this case and seals in the flange 16 and the packing strip 17 while allowing the tabs 18 and 21 to emerge through a cutout 23 in the lid and a cutout 24 in the case, respectively. The lid is held firmly against the case by clips 32 engaging in notches 25.

The fabric 19' of anodes 19a and 19b is permeated by an alkaline electrolyte, such as a KOH solution, which also permeates the anode body itself if this body consists of compacted particles rather than solid metal.

In the normal operation of the cell illustrated in FIG. 2, case 10 may be supported by legs 26 on the floor of a battery casing 27 together with similar cells, not shown, connected in parallel or in series therewith. Ambient air entering the lower end of shell 15 through slot 12 (FIG. 1), and exiting at its upper end through a similar slot 28, continuously depolarizes the cathode material while supplying oxygen which reacts with the electrolyte to form hydroxyl groups which eventually oxidize the active material (e.g., zinc) of the anodes 19a, 19b when the terminals are connected to external loads to discharge the cell. When these anodes are sufficiently oxidized to prevent effective further operation, the clips 24 are opened to release the lid 22 which thereupon can be lifted from the case 10, thereby extracting the cathode 15 together with the spent anodes 19a, 19b on ledge 14. These spent anodes can now be detached from the cathode and replaced by fresh or recharged anodes for renewed operation of the cell after reassembly. Prior to reinsertion of the regenerated electrode package into the case 10, the latter may be easily purged of any waste material therein.

In order to insure the structural rigidity of the flattened tube 15, we prefer to provide the latter with internal spacers or partitions 29 which, as shown in FIG. 2, need not be continuous but may be interrupted by vertically spaced gaps 30. A metallic grid 30' of highly conductive material such as copper, nickel or silver is imbedded in sleeve 15 and extends into terminal tab 18.

Reference may be made to U.S. Pat. Nos. 3,297,484, 3,318,736, 3,378,406, 3,432,354, 3,432,355 and 3,436,270 for details concerning possible anode and cathode materials to be used in cells of this type.

In FIGS. 3 and 4 we show a similar cell case 110 with a lid 122 having two parallel slots 128', 128", the bottom 111 of the case being closed. The cathode of this cell is an undulating envelope 115 forming two upwardly open pockets 115', 115", the sides of these pockets being sealed by elastic contact between the shell edges and the narrow end walls of case 110. Envelope 115 has a pair of top flanges 116, one of them being integral with a terminal tab 118. The lower bights of the undulating structure are slightly spaced above the floor 111 to form a continuous electrolyte compartment there, the electrolyte being indicated at 131. Three anode plates 119a, 119b, 119c, of the same construction as the plates 19a and 19b of the preceding embodiment, are interleaved with the convolutions of envelope 115 and are mechanically and electrically interconnected by flexible straps 120', 120". With the anodes slightly narrower than the case 110, as seen in FIG. 4, the electrolyte also rises alongside the negative plates to their upper limit; this is likewise true of the preceding embodiment. The common terminal tab for the three anode plates is shown at 121. Each pocket 115' and 115" is split into two halves by a respective median partition 129', 129" which, again, may be interrupted by gaps as shown in FIG. 3. These partitions do not reach the bottom of the pockets so that air blown in on one side of the partition (arrows A in FIG. 4) can exit on the other side thereof (arrows B) after sweeping the entire inner cathode surface.

The operation of this cell construction is otherwise identical with that of the preceding embodiment. Replacement of the spent anodes can be carried out after unclamping of lid 122 by the release of clips 132 and upward extraction of the envelope 115 from the case 110. If desired, the top of the envelope may be adhesively secured to the lid, this technique being also available in the preceding embodiment.

Figure 5:
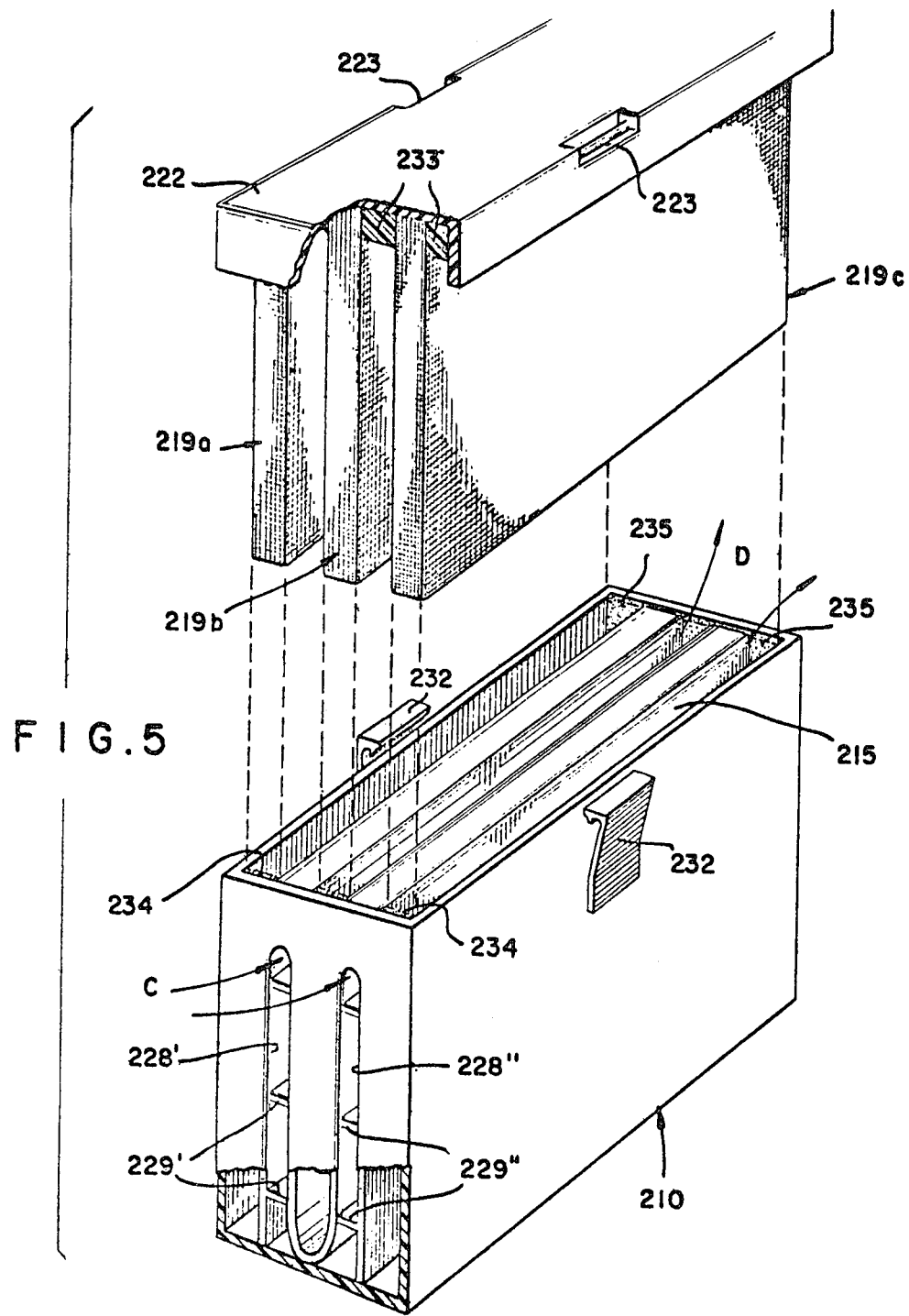
FIG. 5 is an exploded view of a further embodiment.

FIG. 5 illustrates a further embodiment wherein a case 210 has its opposite end walls formed with pairs of parallel slots 228', 228", these slots communicating with the ends of an undulating envelope 215 which is of the same construction as cathode 115 in FIG. 3 but inverted with reference thereto.

Spacers 229′, 229″ extend horizontally within the pockets formed by the cathode but do not interfere with the throughflow of an airstream injected at one apertured face of case 210 and exiting at the other apertured face as indicated by arrows C and D. The corresponding anode structure comprises three plates 219a, 219b, 219c depending from a lid 222 to which they are fixedly secured by a potting compound 233. Similar potting material 234, 235 is used to cement the ends of shell 115 to the narrow walls of case 210.

In contradistinction to the two preceding embodiments, clips 232 are here shown disposed on the long sides of case 210 to engage in notches 223 of lid 222.

In this case, upon release of the clips, the spent anode plates rather than the cathode are withdrawn from the cell case for replacement by a set of active plates secured to another, identical cell lid; the plates so replaced may then be regenerated by an electrolytic reduction for subsequent reuse. This embodiment is useful for vehicles where the movement of the vehicle provides the convective source for propelling a depolarizing gas, i.e., air, into entry ports C through the cathode passages and out through ports D.

FIG. 6 shows another variant of the cell according to the invention, which in this instance forms a unitary assembly enclosed by a prismatic case 310 and a lid 322 (partly broken away in this view).

The case and lid are both provided with slots, such as the one shown at 312, receiving the ends of a cathode 315 in the form of a flattened tube cemented to the slot edges by an epoxy resin. This tube defines a gas passage and is provided with a terminal tab 318; it may be supported internally by spacer elements such as those shown in FIGS. 2 and 3.

Surrounding cathode 315 is an inert conductive wire mesh 330, electrically connected to terminal tab 318 to provide a recharging electrode. The recharging electrode should be inert to the cathode and the electrolyte and preferably should not cause the release of gas from the electrolyte under the standby or discharge conditions. Nickel is a preferred material for the mesh grid of the recharging electrode 330. In some instances it may be desirable to provide a separate terminal for this electrode.

Since it is not necessary to refuel the cells of this embodiment, lid 322 may be permanently cemented to case 310 after assembly.

An anode assembly 319, consisting of anode plates 319a and 319b interconnected by a flexible strap 320, partially surrounds gas cathode 315. To strap 320 is attached a negative (−) terminal lead 321. As in the previous embodiments, it is convenient and preferred to wrap anode plates 319a and 329b with a bibulous separator absorbing within its pores the major portion of the liquid electrolyte, usually aqueous KOH, to provide a conductive medium for electrochemical reaction between the anode material 319 and the channeled cathode 315 during the charging and discharging operations. As there is a tendency for gas-depolarized cells to transpire water during discharge, the cell case 310 is provided with a filling port 337 closable by a plug 336, through which replacement water may be introduced into the cell. The case rests on legs 326.

After discharge, full or partial, the electrodes are connected to the appropriate terminals of a charger and recharged until the oxidized anode material (zinc oxide in the case of zinc anodes) is substantially completely reduced to elemental metal (zinc), thereby substantially completely reactivating the cell.

This same construction, utilizing the chimney effect resulting from the vertical central gas channel of cathode 315 for convective circulation of the depolarizing gas (air), may also be utilized in "one-shot" or throwaway cells in which the charging grid 330 is not necessary and is therefore omitted. For such single use, the lid 322 may also be cemented to the cell case 310. The filling port 337 and its plug 336 may also be eliminated.

FIG. 7 shows an embodiment of a cell similar in principle to the embodiments of FIGS. 1, 2 and 6 in its utilization of the thermal circulation, or chimney effect of gas-passage cathodes but designed to increase the cell capacity by providing multiple channeled cathodes with associated anodes which may be replaceable as in FIGS. 1 and 2 or rechargeable as in FIG. 6.

Case 710 is provided with a cover or lid 722 having a series of apertures 728 communicating with respective gas-passage cathodes which extend to corresponding apertures (not shown) in the bottom of case 710. Case 710 is elevated above its supporting surface by feet 726 to provide access of depolarizing gas to the apertures leading to the channel of each cathode. Within the compartment formed by case 710 the cathodes are flanked or surrounded by anodes which conductively communicate with each cathode through the electrolyte in the compartment. The anodes within the compartment are connected to external leads 721 tied together by a bus bar 740 to form the negative terminal of the cell. The cathodes are conductively connected to external leads 318 tied together by a bus bar 750 to form the positive terminal. It should be noted that the multiple cathode cell of FIG. 7 can be disassembled in a manner similar to the disassembly of the cell of FIG. 1 by the lifting of lid 722, whereby the complete electrode assembly consisting of several cathodes and surrounding anodes depending from lid 722 is slid from case 710 and the anodes, spent by discharge, may be replaced. If desired, however, the internal construction of FIG. 6 may be used and the multiple-cathode cell of FIG. 7 may then be recharged after the replacement of transpired water through ports (not shown) in the far side of case 710.

FIG. 8 shows a set of cells 410, serially connected, built into a single battery case 427. The cells are separated by intercell partitions molded or cemented within battery case 427. Each cell is provided with a channeled cathode of the aforedescribed structure fastened to the walls of a respective aperture 428 in the lid 422 and a corresponding aperture (not shown) in the bottom of its case 410 to form gas-passage compartments extending through the battery from top to bottom. The cathodes within the individual cells are flanked by their respective anodes as shown in the single-cell embodiments of FIGS. 1, 2 and 6. The anodes are connected to external leads 421 and the cathodes to external leads 418.

For series connection, a connector 450 joins the negative lead 418 of one cell to the positive lead 422 of the adjoining cell within the battery. The last positive lead and the last negative lead constitute the battery terminals. Battery case 427 is provided with legs 426 to insure access of air, the preferred depolarizing gas, to the bottom apertures of the cells.

While this invention has been specifically described with respect to air-zinc cells, other depolarizing gases may be used including pure oxygen, chlorine, fluorine, ozone. Anode materials other than zinc which may be used include magnesium, aluminum, iron, tin, cadmium, lithium, calcium, sodium, potassium. It is of course understood that these other materials and gases may require special electrolytes other than alkalies, including dilute and concentrated acids or salt solutions as well as organic electrolytes and liquid ammonia with dissolved ionizing substances therein.

We claim:

1. A method of making and operating a generator of electrical energy, comprising the steps of operatively juxtaposing a gas-depolarizable cathode and at least one anode of oxidizable material in contacting relationship along major surfaces thereof and with the anode resting on a formation of said cathode, placing said anode and cathode in a housing, introducing an electrolyte into said housing, admitting a depolarizing gas into contact with said cathode, connecting said anode and cathode across a load with consequent oxidation of the metal of said anode by the resulting current flow, removing the oxidized anode jointly with said cathode from said housing, separating the anode from the cathode by a relative motion generally transverse to said major surfaces, substituting a fresh anode for said oxidized anode adjacent said cathode, and returning said cathode together with said fresh anode to said housing.

2. A method as defined in claim 1 wherein said cathode is plate-shaped and said anode is divided into two flat halves folded about said cathode.

* * * * *